(12) United States Patent
Hu et al.

(10) Patent No.: US 12,591,048 B2
(45) Date of Patent: Mar. 31, 2026

(54) MULTI-BEAM LASER RADAR AND SELF-MOVING VEHICLE

(71) Applicant: Leishen Intelligent System Co., Ltd., Shenzhen (CN)

(72) Inventors: Xiaobo Hu, Shenzhen (CN); Fang Bai, Shenzhen (CN)

(73) Assignee: Leishen Intelligent System Co., Ltd., Shenzhen (CN)

( * ) Notice: Subject to any disclaimer, the term of this patent is extended or adjusted under 35 U.S.C. 154(b) by 1122 days.

(21) Appl. No.: 17/569,610

(22) Filed: Jan. 6, 2022

(65) Prior Publication Data

US 2022/0128667 A1     Apr. 28, 2022

Related U.S. Application Data

(63) Continuation of application No. PCT/CN2021/077794, filed on Feb. 25, 2021.

(30) Foreign Application Priority Data

Mar. 5, 2020     (CN) .......................... 202010146628.8

(51) Int. Cl.
*G01S 7/481*          (2006.01)
*G01S 17/89*          (2020.01)
(Continued)

(52) U.S. Cl.
CPC ........... *G01S 7/4817* (2013.01); *G01S 7/4811* (2013.01); *G01S 17/89* (2013.01); *G01S 17/931* (2020.01); *G02B 26/108* (2013.01)

(58) Field of Classification Search
CPC .... G01S 7/4817; G01S 17/89; G01S 17/4811; G01S 17/931; G01S 7/4815; G01S 17/42;
(Continued)

(56) References Cited

U.S. PATENT DOCUMENTS 9,239,959 B1      1/2016    Evans et al.
2014/0247349 A1   9/2014    Llc

FOREIGN PATENT DOCUMENTS

CN       107918118 A      4/2018
CN       109709529 A      5/2019
(Continued)

OTHER PUBLICATIONS

Zhang et al., CN109070708 translation, 10 pages, prepared May 22, 2025 (Year: 2025).*
(Continued)

*Primary Examiner* — Daniel L Murphy
(74) *Attorney, Agent, or Firm* — IPro, PLLC; Na Xu

(57)          ABSTRACT

A multi-beam laser radar includes a rotating prism, a rotating mechanism, and two transceiver modules. The rotating prism includes at least three side surfaces around a scanning rotation axis of the rotating prism; at least two of the at least three side surfaces are reflecting surfaces, and in all reflecting surfaces, included angles between at least two of the reflecting surfaces and the scanning rotation axis of the rotating prism are unequal. The rotating mechanism drives the rotating prism to rotate around the scanning rotation axis. The two transceiver modules are positioned at two sides of the rotating prism respectively and asymmetrical with respect to the scanning rotation axis, an included angle formed by laser emitting surfaces of the two transceiver modules is less than 180 degrees, such that scanning fields of view in at least two directions are formed when the rotating prism rotates around the scanning rotation axis.

20 Claims, 9 Drawing Sheets

(51) Int. Cl.
     *G01S 17/931*          (2020.01)
     *G02B 26/10*           (2006.01)
(58) Field of Classification Search
     CPC ........ G01S 7/481; G01S 7/4816; G01S 7/484;
                          G02B 26/108; G02B 5/20; G02B
                                    26/0816; G01D 5/00
     USPC ....................................................... 356/4.01
     See application file for complete search history.

(56)                    References Cited

FOREIGN PATENT DOCUMENTS

| | | | | | | |
|---|---|---|---|---|---|---|
| CN | 109752704 | A | | 5/2019 | | |
| CN | 109870708 | A | * | 6/2019 | .............. | B60J 7/024 |
| CN | 111157975 | A | | 5/2020 | | |
| JP | 2003-329773 | A | | 11/2003 | | |
| JP | 2006-038854 | A | | 2/2006 | | |
| JP | 2010-071725 | A | | 4/2010 | | |
| JP | 2014-142288 | A | | 8/2014 | | |
| JP | 2019-518204 | A | | 6/2019 | | |
| JP | 2019-117197 | A | | 7/2019 | | |
| WO | 98/16801 | A | | 4/1998 | | |

OTHER PUBLICATIONS

Zhang et al., CN109070708 abstract, 1 page, prepared May 22,
2025. (Year: 2025).*
Zhang et al., CN109070708 claims, 4 pages, prepared May 22,
2025. (Year: 2025).*
Zhang et al., CN109070708 description, 51 pages, prepared May 22,
2025. (Year: 2025).*
International Search Report of PCT Patent Application No. PCT/
CN2021/077794 issued on May 20, 2021.

* cited by examiner

Light emergent surface

Light emergent surface

Light emergent surface

Light emergent surface

MULTI-BEAM LASER RADAR AND SELF-MOVING VEHICLE

CROSS-REFERENCE TO RELATED APPLICATIONS

The present disclosure is a continuation of International Application No. PCT/CN2021/077794, filed on Feb. 25, 2021, which claims priority of Chinese Patent Application No. 202010146628.8, filed on Mar. 5, 2020, titled "MULTI-BEAM LASER RADAR AND SELF-MOVING VEHICLE", the contents of which are incorporated herein by reference.

TECHNICAL FIELD

The embodiments of the present disclosure relate to laser radar technologies, and particularly to a multi-beam laser radar and a self-moving vehicle.

BACKGROUND

With the development and application of laser technologies, laser scanning technologies are increasingly used in a variety of fields such as measurement, transportation, driving assistance, and mobile robots. Laser radars are radar systems that detect the position, velocity, posture and other characteristics of a target by laser. The basic working principle of a laser radar is to first emit a laser beam to a target, then receive a signal reflected back from the target, and compare the received signal with the emitted signal, whereby the distance, azimuth, height, velocity, posture, even shape and other information of the target can be obtained.

At present, the requirements for performance parameter standards of the laser radars are different in various applications. For example, some applications need a large detection range, and other applications need a large field of view without blind spots at close range, but these parameter standards are difficult to meet simultaneously. Many factors of laser radars affect each other. For example, the angular resolution of laser radars with large field of view tends to be constrained, and the high resolution will be subject to the aspects such as cost, volume, and testing, resulting in high cost, large volume, and complex modulation mode, which is not conducive to popularization and application of the laser radars.

SUMMARY

According to embodiments of the present disclosure, a multi-beam laser radar and a self-moving vehicle are provided.

An embodiment of the present disclosure provides a multi-beam laser radar, including:

a rotating prism, the rotating prism including at least three side surfaces positioned around a scanning rotation axis of the rotating prism; at least two of the at least three side surfaces being reflecting surfaces, and in all reflecting surfaces of the rotating prism, included angles between at least two of the reflecting surfaces and the scanning rotation axis of the rotating prism being unequal;

a rotating mechanism, configured to drive the rotating prism to rotate around the scanning rotation axis; and two transceiver modules positioned at two sides of the rotating prism, respectively, the two transceiver modules positioned asymmetrically with respect to the scanning rotation axis, an included angle formed by laser emitting surfaces of the two transceiver modules being less than 180 degrees, such that scanning fields of view in at least two directions are formed when the rotating mechanism drives the rotating prism to rotate around the scanning rotation axis.

Another embodiment of the present disclosure provides a self-moving vehicle, including:

a vehicle body, capable of being self-movable; and the above-mentioned multi-beam laser radars, the multi-beam laser radars positioned at two sides of a head and/or rear of the vehicle body.

Details of one or more embodiments of the present disclosure are set out in the attached drawings and descriptions below. Other features and advantages of the present disclosure will become apparent from the specification, drawings and claims.

BRIEF DESCRIPTION OF THE DRAWINGS

To describe the embodiments of the present disclosure or the technical solutions in the prior art more clearly, the following will give a brief introduction to the drawings associated with the embodiments of the present disclosure or the prior art. It is obvious that the drawings in the following description are only intended to illustrate some embodiments of the present disclosure. For those skilled in the art, the drawings of other embodiments can be obtained according to these drawings without any creative work.

DETAILED DESCRIPTION

Figure 1:
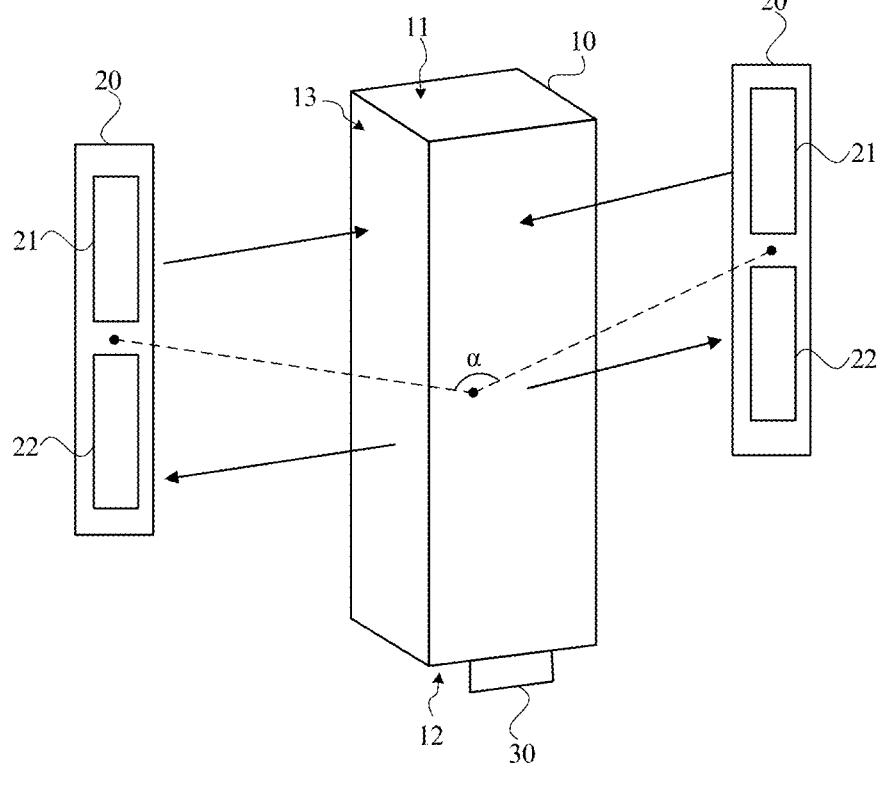
FIG. 1 is a schematic diagram of a multi-beam laser radar in accordance with an embodiment of the present disclosure.

Embodiments of the present disclosure are described in detail below, exemplary embodiments are shown in the attached drawings where identical or similar labels throughout designate identical or similar elements or elements having the same or similar functions. The embodiments described below by reference to the attached drawings are illustrative and are intended to explain the present disclosure and are not to be construed as a limitation of the present disclosure.

The terms used in the embodiments of the present disclosure are for the purpose of describing specific embodiments only and are not intended to limit the present disclosure. The direction words "up", "down", "left" and "right" in the present disclosure are all based on the directions shown in the drawings, and should not be understood as limiting the embodiments of the present disclosure. In addition, in the context, when it is mentioned that an element is formed "up" or "down" on another element, it can not only be directly formed "up" or "down" on another element, but also indirectly formed "up" or "down" on another element through intermediate elements. The terms "first", "second" and so on are used for descriptive purposes only, and do not mean any order, quantity, or importance, but only to distinguish different components. For those skilled in the art, the specific meaning of the above terms in the present disclosure can be understood in specific circumstances.

Figure 2:
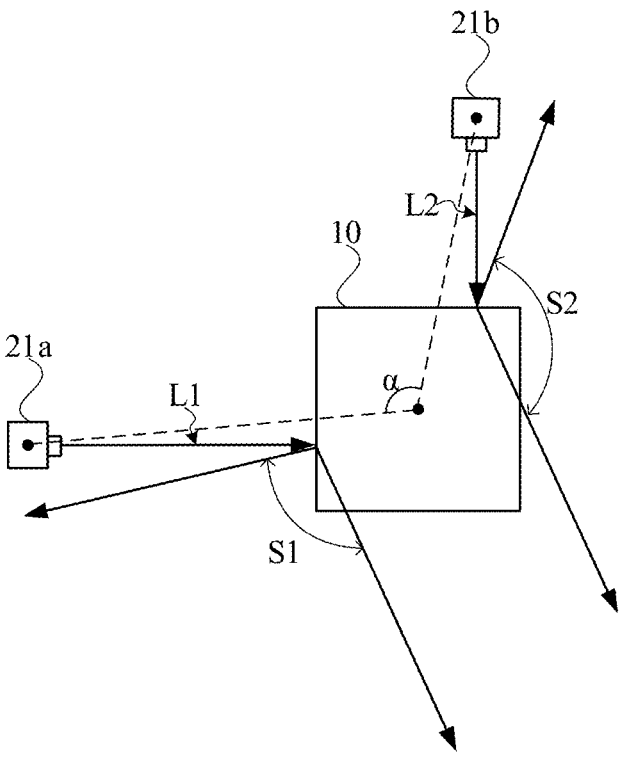
FIG. 2 is a top view of the multi-beam laser radar shown in FIG. 1.

FIG. 1 is a schematic diagram of a multi-beam laser radar in accordance with an embodiment of the present disclosure, and FIG. 2 is a top view of the multi-beam laser radar shown in FIG. 1. Referring to FIGS. 1 and 2, the multi-beam laser radar of the embodiment includes a rotating prism 10, a rotating mechanism 30, and two transceiver modules 20; the rotating prism 10 includes a top surface 11, a bottom surface 12, and at least three side surfaces 13 positioned between the top surface 11 and the bottom surface 12 (in FIG. 1, four side surfaces are illustrated as an example, which is not the limitation of the present disclosure); the at least three side surfaces 13 are located around the scanning rotation axis of the rotating prism 10; at least two of the at least three side surfaces 13 are reflecting surfaces; in all the reflecting surfaces of the rotating prism 10, the included angles between at least two of the reflecting surfaces and the scanning rotation axis are unequal; the rotating mechanism 30 is configured to drive the rotating prism 10 to rotate around the scanning rotation axis; the two transceiver modules 20 are positioned at two sides of the rotating prism 10, respectively, and are positioned asymmetrically with respect to the scanning rotation axis, as shown in FIG. 1 and FIG. 2. The included angle formed by the laser emitting surfaces of the two transceiver modules 20 is less than 180 degrees, such that the two transceiver modules 20 can emit laser beams from different directions, the laser beams are projected in at least two directions with the rotation of the rotating prism 10 to form corresponding scanning fields of view, thereby providing scanning detection in at least two directions for a self-moving object equipped with the laser radar. Thus, there is no need to install laser radars on different directions of the self-moving object, thus reducing the cost and simplifying the structure. In other embodiments, the position of the two transceiver modules 20 relative to the rotating prism 10 can also be illustrated by defining the phase position relationship of the centers of the components. Specifically, the included angle a formed by the connecting lines of the centers of the two transceiver modules and the center of the rotating prism 10 is less than 180°. Each transceiver module 20 includes a laser emitting unit 21 and a laser receiving unit 22. The laser emitting unit 21 forms a scanning field of view when the rotating prism 10 rotates around the scanning rotation axis.

Optionally, the at least three side surfaces 13 between the top surface 11 and the bottom surface 12 are all reflecting surfaces, and among all the reflecting surfaces of the rotating prism 10, the included angles between at least two reflecting surfaces and the scanning rotation axis of the rotating prism 10 are not equal. Compared with the condition where at least three side surfaces 13 between the top surface 11 and the bottom surface 12 are not all reflecting surfaces, the number of reflecting surfaces of the rotating prism 10 of the present disclosure is increased, thus expanding the number of beams of the multi-beam laser radar.

Direction of the present disclosure refers to the orientation. East, south, west, and north are the basic directions, and northeast, southeast, northwest, and southwest are the intermediate directions. The scanning field of view formed by one transceiver module 20 covers at least one direction. Therefore, in the present disclosure, the two transceiver modules 20 are positioned on both sides of the rotating prism 10 respectively, the two transceiver modules 20 are asymmetrically positioned relative to the scanning rotation axis, and the included angle between the laser emitting surfaces of the two transceiver modules 20 is less than 180 degrees. When the rotating mechanism 30 drives the rotating prism 10 to rotate around the scanning rotation axis, at least two scanning fields of view corresponding to two directions are formed.

In certain embodiment, the number of transceiver modules 20 is greater than 2, and the transceiver modules 20 are positioned on at least two sides of the rotating prism 10. The transceiver modules 20 are asymmetrically positioned relative to the scanning rotation axis, and the included angle between the laser emitting surfaces of any two transceiver modules 20 is less than 180 degrees, such that each transceiver module 20 can emit laser beams from different direction, thus achieving a wide horizontal scanning angle.

Understandably, the multi-beam laser radar provided in this embodiment can be applied to self-driving vehicles, automatic navigation robots and other fields, and can also be separately applicable to 3D mapping, obstacle avoidance and other applications. The transceiver module 20 is configured to transmit the detection beam and receive the echo beam. The detection beam can be an infrared laser beam, and the echo beam can be received by using a photodetector as a light receiving element. The specific implementation can be selected according to the actual situation. The detection beams emitted by one of the transceiver modules 20 are reflected by the reflecting surfaces of the rotating prism 10 and transmitted to the to-be-measured target. The echo beams returning from the to-be-measured target is reflected by the reflecting surfaces of the rotating prism 10 and received by the same transceiver module 20. The rotating mechanism 30 is configured to drive the rotating prism 10 to rotate, for example, a motor. When the rotating prism 10 rotates, the detection beam emitted by each transceiver module 20 can realize horizontal scanning and form a corresponding scanning field of view. In this embodiment, the horizontal direction refers to a direction perpendicular to the scanning rotation axis of the rotating prism, and the vertical direction refers to a direction parallel to the scanning rotation axis of the rotating prism, the description will not be repeated elsewhere. In specific implementation, each transceiver module 20 can include multi-channel output and multi-channel reception, thus forming a scanning range of different viewing angles.

Optionally, as shown in FIG. 2, the scanning fields of view of the two transceiver modules 20 are not overlapped in a horizontal direction. In other embodiments, the scanning fields of view of the two transceiver modules 20 can be partially overlapped in a horizontal direction.

In the technical solution of this embodiment, at least two side surfaces of the rotating prism 10 are reflecting surfaces, and the included angles between at least two of the reflecting surfaces and the scanning rotation axis of the rotating prism are unequal; when the rotating mechanism drives the rotating prism to rotate, each reflecting surface can make one beam realize a horizontal scanning, and different reflecting surfaces can turn a same beam into a plurality of beams, thus increasing the number of scanning beams. The laser radar includes two transceiver modules, and the two transceiver modules are positioned asymmetrically relative to the scanning rotation axis, the laser emitting unit of each transceiver module can form a scanning field of view by the rotation of the rotating prism around the scanning rotation axis, whereby the two transceiver modules can emit laser beams from different directions; the laser beams are projected to at least two directions with the rotation of the rotating prism to form corresponding scanning fields of view, thereby providing scanning detection in at least two directions for the self-moving object equipped with the laser radar. Thus, there is no need to install laser radars on different directions of the self-moving object, thus reducing the cost and simplifying the structure.

Optionally, the two transceiver modules 20 include a first transceiver module and a second transceiver module; the first transceiver module forms a first scanning field of view when the rotating prism 10 rotates, and the second transceiver module forms a second scanning field of view when the rotating prism 10 rotates; the vertical scanning resolution of the first transceiver module in the first scanning field of view is greater than the vertical scanning resolution of second transceiver module in the second scanning field of view. In general, there are different requirements for scanning and detecting obstacles in different directions during the movement of the self-moving object. For example, during navigation of the self-moving object, it is necessary for the self-moving object to determine the distance of obstacles in front of the road accurately, and the farther the distance can be detected, the better. However, for the sides of the self-moving object, it is only necessary to scan obstacles in a short distance range, so as to provide reference for steering and other operations. Therefore, in the laser radar of this embodiment, the angular resolution of one transceiver module 20 is greater than the angular resolution of another transceiver module 20, which can not only meet the use requirements, but also reduce the product cost. In another embodiment, the first transceiver module and the second transceiver module have different pulse frequencies, for example, for the transceiver module 20 that needs to detect long-distance, the adopted pulse frequency is smaller than that of the transceiver module that only needs to detect obstacles, so as to ensure that both the distance detection of long-distance obstacles and the scanning detection of short-distance obstacles can be realized.

As an example, continuing to referring to FIG. 2, the laser emitting unit 21*a* of the first transceiver module emits a laser beam L1, and the laser emitting unit 21*b* of the second transceiver module emits a laser beam L2. When the rotating prism 10 rotates, the laser beam L1 scans to form the first scanning field of view S1, and the laser beam L2 scans to form the second scanning field of view S2. Taking a tetrahedral rotating prism as an example, the laser emitting unit 21*a* of the first transceiver module emits X laser beams at different angles in a vertical direction, and each laser beam becomes four laser beams in the vertical direction (or vertically downward, subject to the prism design) through the tetrahedral rotating prism. Therefore, the X laser beams become 4× laser beams for scanning detection thus forming a first scanning field of view S1. Through diffuse reflection on the surface of the to-be-measured target, the laser beams of the first scanning field of view S1 pass through the tetrahedral rotating prism again and are received by X different photodetectors of the laser receiving unit (not shown in FIG. 2) of the first transceiver module. The laser beams with different angles can only be received by corresponding photodetectors. According to the actual needs, corresponding parameters can be set such that the horizontal angle of the first scanning field of view S1 reaches 0-180 degrees, and the detection distance is 100 m, 200 m, or 300 m, or more. Within the scanning range, the beams in the horizontal and vertical directions are more intensive.

The laser emission unit 21*b* of the second transceiver module emits Y (Y can be the same as X or different from X, which can be designed according to the actual needs) laser beams at different angles in the vertical direction, and each laser beam changes into four laser beams in the vertical direction through the tetrahedral rotating prism. Therefore, the Y laser beams become 4Y laser beams for scanning detection, so as to form a second scanning field of view S2. Through diffuse reflection on the surface of the to-be-measured target, the laser beams of the second scanning field of view S2 pass through the tetrahedral rotating prism again and are received by Y different photodetectors of the laser receiving unit (not shown in FIG. 2) of the second transceiver module. The laser beams with different angles can only be received by corresponding photodetectors. According to the actual needs, corresponding parameters can be set such that the horizontal angle of the second scanning field of view S2 reaches 0-180 degrees. The angle in the vertical direction reaches 0-180 degrees; the detection distance is short, the distribution in the horizontal and vertical directions is sparse, and it is mainly used for blindness detection, that is, the existing laser radar includes two types: long distance detection radar and blindness detection radar. The multi-beam laser radar of this embodiment combines them into one radar, which can detect long distance and blindness simultaneously. The whole horizontal scanning angle of the laser radar can be greater than 180 degrees or even greater than 270 degrees, thus achieving the scanning in a wide field of view.

Figure 3:
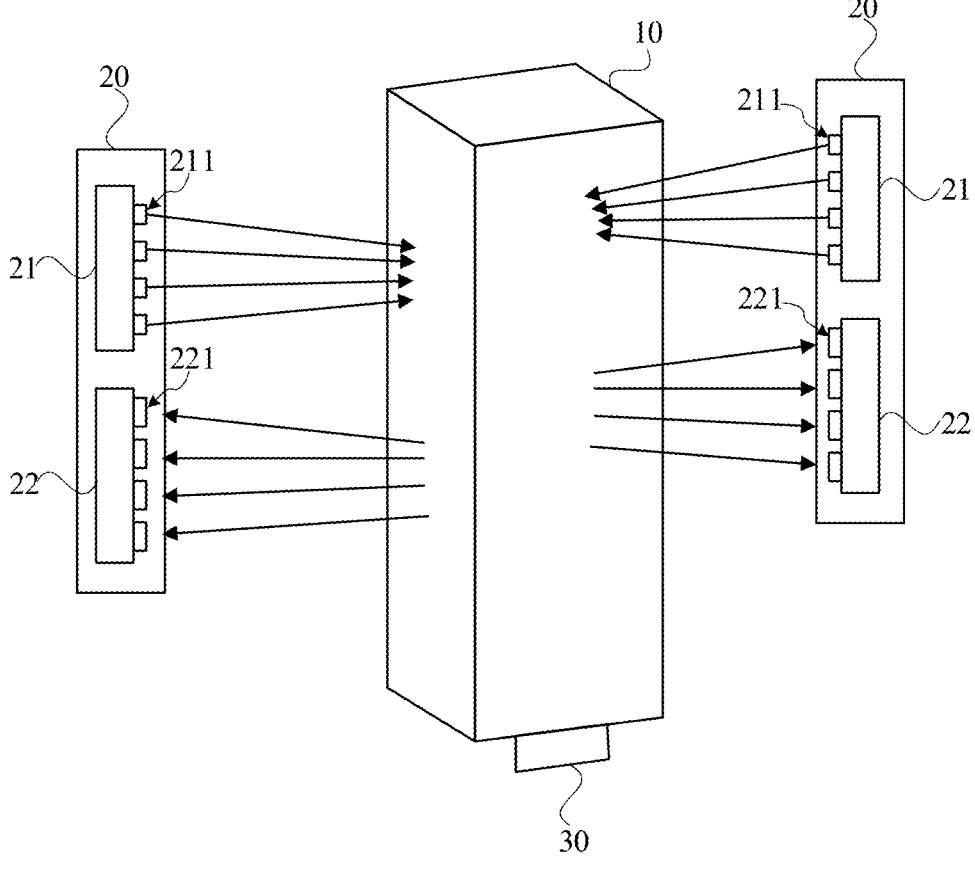
FIG. 3 is a schematic diagram of a multi-beam laser radar in accordance with another embodiment of the present disclosure.

Based on the above embodiments, FIG. 3 is a schematic diagram of another multi-beam laser radar of the embodiment of the present disclosure. Referring to FIG. 3, optionally, each transceiver module 20 includes at least one laser emitting unit 21 and at least one laser receiving unit 22; each laser emitting unit 21 includes a plurality of lasers 211, and the included angles of the emergent beams of the plurality of lasers 211 in one laser emitting unit 21 are nonzero; and the lasers 211 of one laser emitting unit 21 are integrated on one circuit board; each laser receiving unit 22 includes a plurality of photodetectors 221, each photodetectors 221 is configured to receive a light beam emitted by a corresponding laser 211 and reflected by a to-be-measured target; and the photodetectors 221 of one laser receiving unit 22 are integrated on one circuit board.

It can be understood that each laser emitting unit 21 includes the plurality of lasers 211, and each laser receiving unit 22 includes the plurality of photodetectors 221, which can effectively increase the field angle of view of the multi-beam laser radar in the vertical direction. In a specific implementation, the laser 211 may be a laser diode (LD) or a vertical cavity surface emitting laser (VCSEL), and both the LD and the VCSEL may output to free space or output through optical fiber coupling; the laser 211 may also be a fiber laser, a gas laser, a solid-state laser, or the like. The photodetector 221 may be an avalanche photo diode (APD) arranged in multiple arrays, a single APD with large area, a focal plane array detector, a multi pixel photon counter (MPPC) detector arranged at a single point or in an array, or other types of array detectors known to those skilled in the art.

Optionally, the emergent beams of the lasers of one laser emitting unit are arranged in a divergent form or in a converging form.

Figure 4:
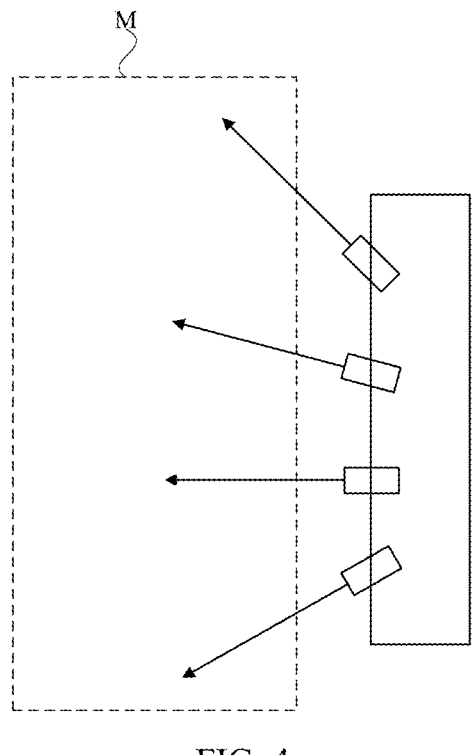
FIG. 4 and FIG. 5 are schematic diagrams respectively showing lasers are emitting lights.
Figure 5:
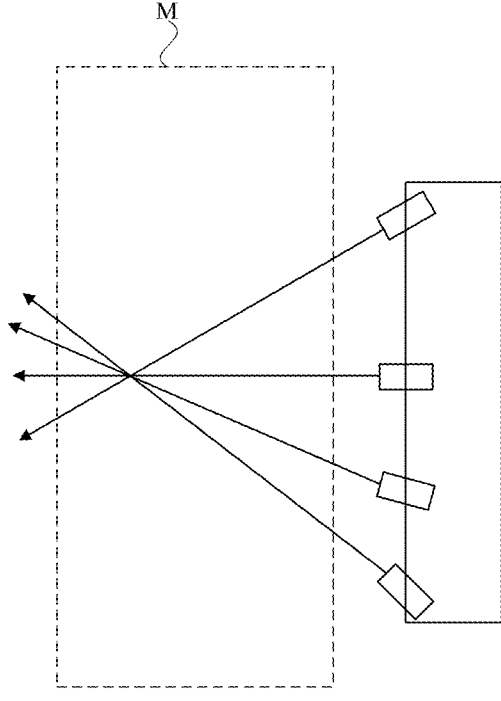

As an example, FIG. 4 and FIG. 5 are schematic diagrams respectively showing the lasers of the embodiment of the present disclosure are emitting lights. FIG. 4 and FIG. 5 both schematically show that each laser emission unit includes four lasers. In other embodiments, the numb of the lasers can also be 8, 16 and others, which is determined according to the actual needs. Referring to FIGS. 4 and 5, all the emergent beams of the four lasers are in one emergent plane M, and the emitting elevation angles of the emergent beams of each transceiver module are different from each other. When the four spatial angles are different, four lasers can produce 16 scanning beams. The four laser beams in FIG. 4 are arranged in a divergent form, and the four laser beams in FIG. 5 are arranged in a convergent form.

In the above embodiments, the plurality of lasers and the plurality of photodetectors may be individually integrated on one circuit board, such that the testing can be performed at the same time, thus simplifying the testing difficulty, and saving the cost. It should be noted that in the specific implementation, the plurality of lasers and the plurality of photodetectors can be arranged in a single group or in multiple groups, which is not limited in the embodiment of the present discourse. Specifically, when the plurality of lasers of one laser emitting unit are arranged in a single group (one row and one column), the plurality of photodetectors of the laser receiving unit in the same group are arranged in a single group as the laser emitting units; when the plurality of lasers of one laser emitting unit are arranged in multiple groups (multiple rows and multiple columns), the plurality of photodetectors of the laser receiving unit in the same group are arranged in multiple groups as the laser emitting units; the laser emitting unit of each group includes at least two lasers, and the laser receiving unit of each group includes at least two photodetectors. In another embodiment, the laser emitting units and the laser receiving units of each transceiver module may be integrated in one module, which is conducive to assembly and testing.

Figure 6:
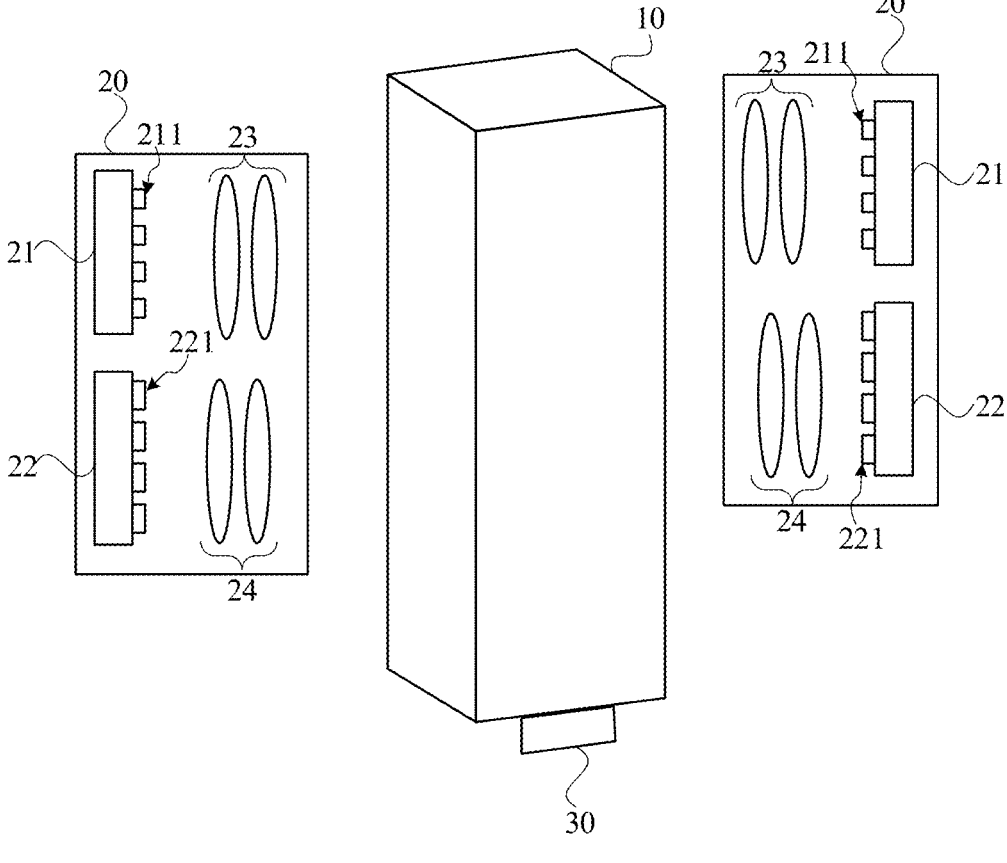
FIG. 6 is a schematic diagram of a multi-beam laser radar in accordance with still another embodiment of the present disclosure.

FIG. 6 is a schematic diagram of still another multi-beam laser radar of the embodiment of the present disclosure. Referring to FIG. 6, optionally, each transceiver module 20 further includes a transmitting mirror group 23 and a receiving mirror group 24; the transmitting mirror group 23 is positioned between the laser emitting unit 21 and the rotating prism 10, for collimating a laser beam emitted by the laser emitting unit 21 and projecting the collimated laser beam on the reflecting surfaces of the rotating prism 10, and the receiving mirror group 24 is positioned between the laser receiving unit 22 and the rotating prism 10, for converging the laser beam reflected by the reflecting surfaces of the rotating prism 10 and irradiating the converged laser beam on the laser receiving unit 22.

Understandably, the beam quality directly emergent from the laser 211 of the laser emitting unit 21 may not meet the requirement of detection distance. Therefore, the transmitting mirror group 23 is positioned on the light emitting side of the laser emitting unit 21 to focus and collimate the emergent beam of the laser emitting unit 21, such that the beam is emitted at a relatively small divergence angle, thus achieving long-distance target detection. The beam returning from the to-be-measured target tends to attenuate after spatial transmission. Therefore, the receiving mirror group 24 is positioned on the light incident side of the laser receiving unit 22 to enable the laser receiving unit 22 to collect as many echo beams as possible. In specific implementation, the field of view of the receiving mirror group 24 is between 0-180 degrees.

It should be noted that the transmitting mirror group and the receiving mirror group shown in FIG. 6 each include only two lenses, which only schematically illustrates the structure of each mirror group. In specific implementation, the structure of the mirror group can be designed according to the actual optical path conditions.

Optionally, the included angles between all the reflecting surfaces and the scanning rotation axis of the rotating prism are greater than or equal to 0 degrees, and less than or equal to 10 degrees.

The included angles between the reflecting surfaces and the scanning rotation axis are between 0 degrees and 10 degrees, which avoids too large tilt angle of the reflection surfaces of the rotating prism and improve the stability of the rotating prism in rotation.

In a certain embodiment, the rotating prism may include at least four reflecting surfaces. Optionally, for any specific reflecting surface, the included angle between the specific reflecting surface and the scanning rotation axis is greater than the included angles between the two neighboring reflecting surfaces of the specific reflecting surface and the scanning rotation axis, or less than the included angles between the two neighboring reflecting surfaces of the specific reflecting surface and the scanning rotation axis. For example, the included angles between the four reflecting surfaces of the rotating prism and the scanning rotation axis are marked respectively as $\angle 1$, $\angle 2$, $\angle 3$ and $\angle 4$ clockwise, where $\angle 1 = 0°$, $\angle 2 = 2°$, $\angle 3 = 1°$, $\angle 4 = 1.5°$. $\angle 2$ is greater than $\angle 1$ and $\angle 3$ at the same time, and $\angle 3$ is less than $\angle 2$ and $\angle 4$ at the same time. This design makes the rotating prism more stable when rotating. Further, at least one reflecting surface of the rotating prism is a layered structure, for example, at least two reflection areas are successively distributed along the direction of the scanning rotation axis, and the included angles between the at least two reflection areas and the scanning rotation axis are not the same, such that the laser beams emitted by multiple lasers are unevenly distributed in the vertical direction when passing through the layered structure. In one embodiment, the included angle between the reflection area in the middle and the scanning rotation axis is greater than the included angles between the reflection areas on both sides and the scanning rotation axis, such that in the vertical direction, the laser beams are dense in the middle and sparse at both sides.

Figure 7:
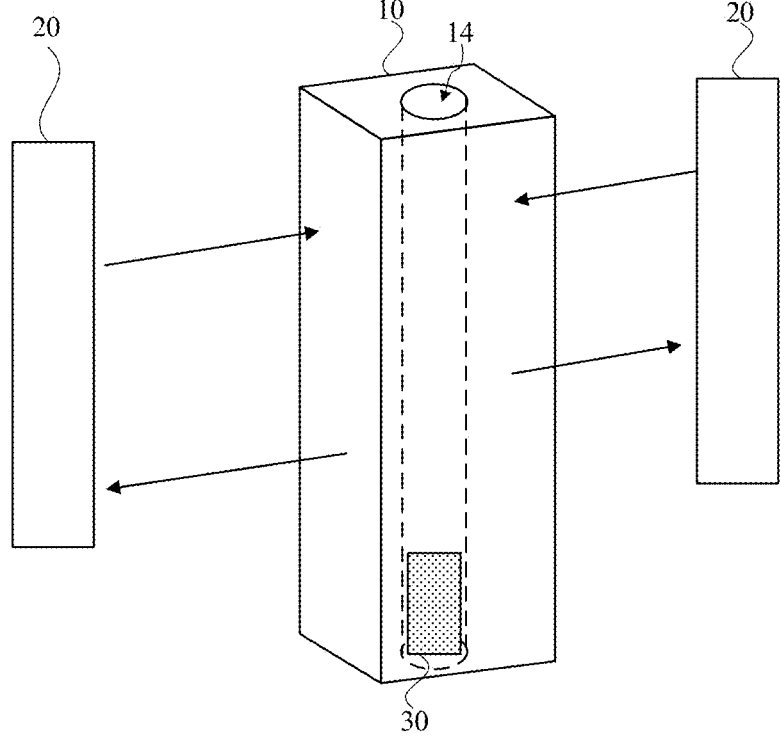
FIG. 7 is a schematic diagram of a multi-beam laser radar in accordance with yet another embodiment of the present disclosure.

FIG. 7 is a schematic diagram of yet another multi-beam laser radar of the embodiment of the present disclosure. Referring to FIG. 7, optionally, a plurality of sidewalls of the rotating prism 10 forms a hollow shaft 14; and the rotating mechanism 30 is positioned in the hollow shaft 14 of the rotating prism 10.

Understandably, the rotating mechanism 30 is positioned in the hollow shaft 14 of the rotating prism 10 can effectively reduce the size of the laser radar, which is conducive to the miniaturization of the radars.

Figure 8:
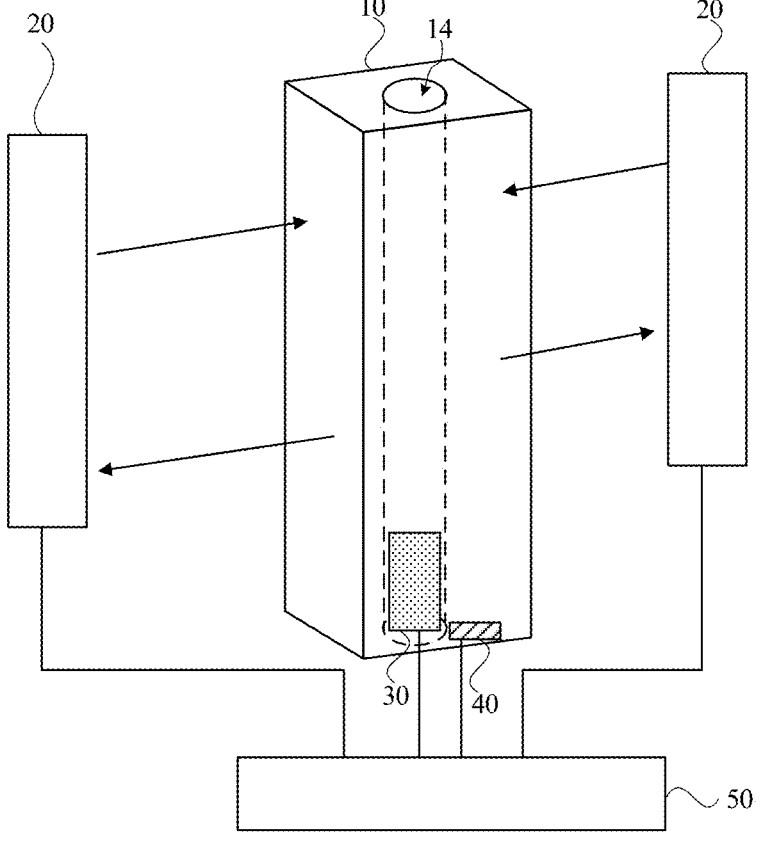
FIG. 8 is a schematic diagram of a multi-beam laser radar in accordance with still yet another embodiment of the present disclosure.

FIG. 8 is a schematic diagram of still yet another multi-beam laser radar of the embodiment of the present disclosure. Referring to FIG. 8, optionally, the multi-beam laser radar of the embodiment further includes an encoder 40 positioned on the rotating prism 10, for detecting and outputting angle information of the rotating prism 10 and/or speed information of the rotating mechanism 30; and/or a main control board 50, and the rotating mechanism 30, the encoder 40, and the laser emitting units and the laser receiving units of the transceiver modules 20 are all connected to the main control board 50. For example, in a certain embodiment, the encoder 40 can output the angle information of the rotating prism 10 and feed the speed information of the rotating mechanism 30 back in real time to a control system, so as to control the speed of the rotating mechanism 30. Wherein, the encoder 40 may be a photo-electric code disk, magnetic code disk and other types of encoders, which can be selected according to the actual situation in specific implementation.

Understandably, the specific construction of each trans-ceiver module 20, i.e., laser emitting unit and laser receiving unit, are not shown in FIG. 8. Therefore, the main control board 50 is illustratively connected to the transceiver mod-ule 20. In specific implementation, the main control board 50 can include structures such as power supply, field pro-grammable gate array (FPGA), network port chip and ana-log-to-digital converter (ADC), so as to realize the function of the laser radar, which can be designed according to the actual conditions in specific implementation.

Figure 9:
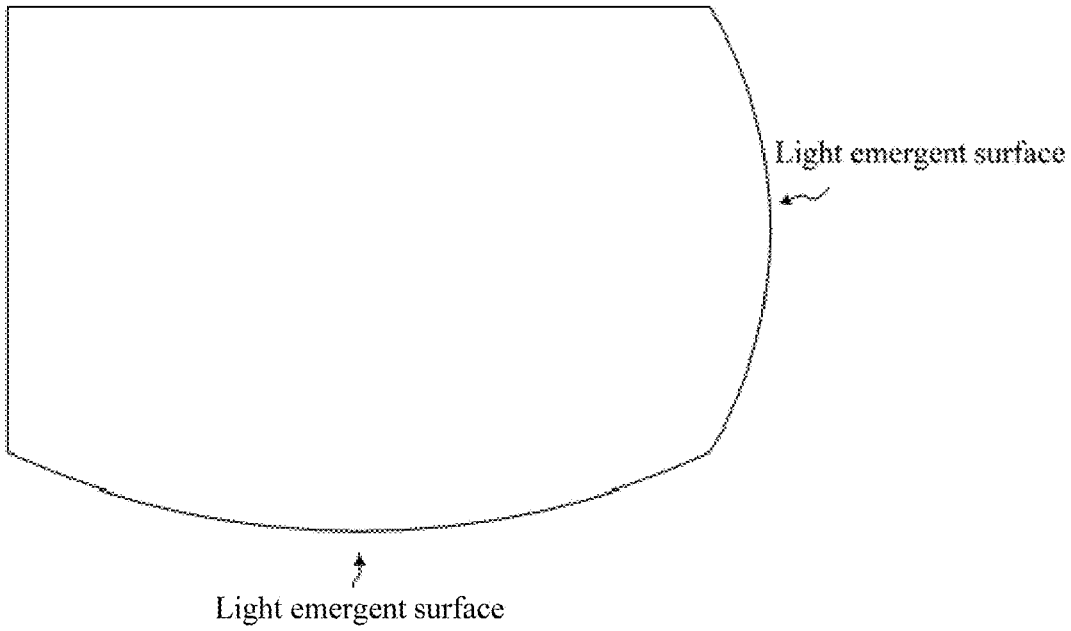
FIG. 9 and FIG. 10 are schematic diagrams of a filter cover in accordance with an embodiment of the present disclosure.
Figure 10:
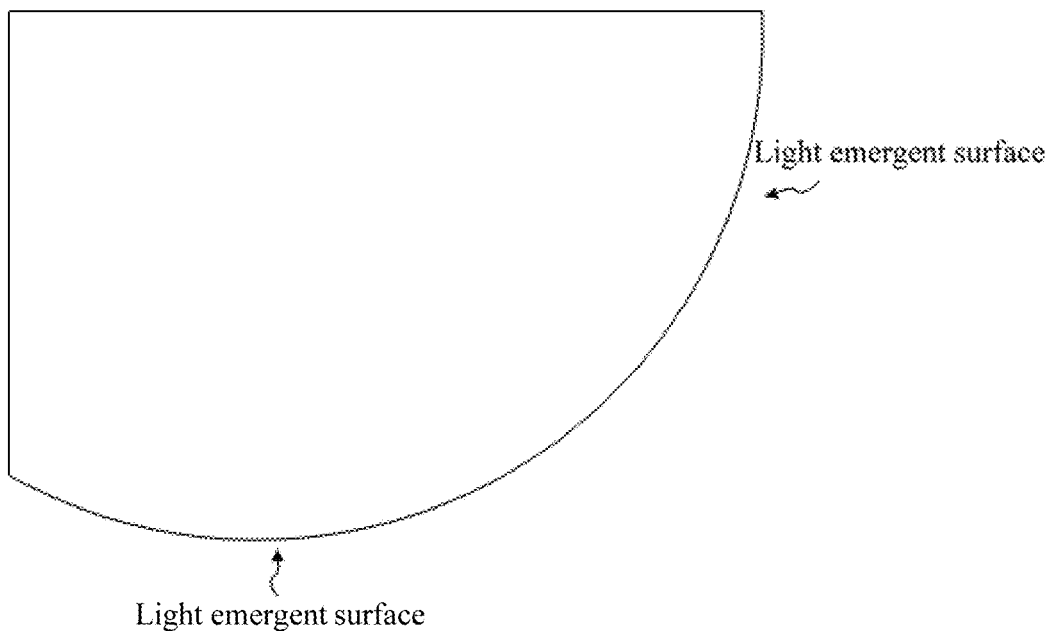

Optionally, the multi-beam laser radar further includes a housing and a filter cover; the housing and the filter cover form a closed shell to protect the multi-beam laser radar; the rotating prism 10, the rotating mechanism 30 and the trans-ceiver modules 20 are all positioned in the shell; the filter cover includes two filtering areas facing emergent directions of the two transceiver modules 20, respectively, and the two filtering areas are both curved in shape. The joints of the two filtering areas are in a smooth transition or spliced at a certain angle, so as to provide a large emission angle to meet the requirements of the large scanning field of view of the laser radar of the embodiment. Schematically, FIG. 9 and FIG. 10 are top views of a filter cover of the embodiment of the present disclosure. The areas of the filter cover corre-sponding to the scanning fields of view of the multi-beam laser radar are curved in shape, which, on the one hand, can reduce the size of the multi-beam laser radar, and on the other hand, when a light with a large incident angle is projected on the filter cover, the laser transmittance reduces and the reflectivity increases, which will not only affect the long-distance detection of the radar, but also lead to the problem of short-distance light interference of the radar. The filter cover is curved in shape can avoid the excessive large angle of the light projecting on the filter cover and improve the performance of the multi-beam laser radar.

Figure 11:
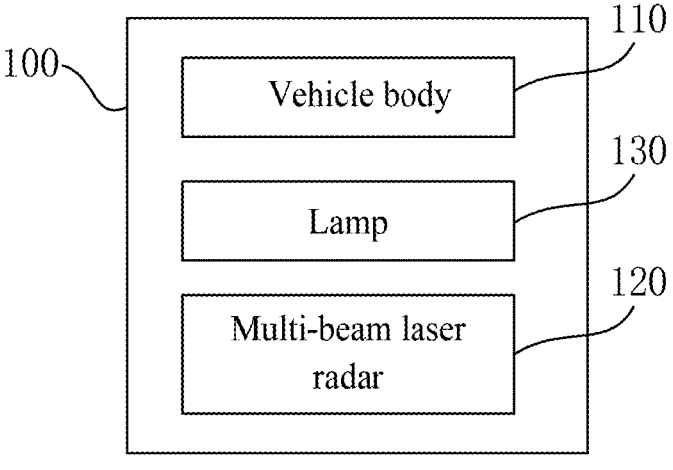
FIG. 11 is a schematic diagram of a self-moving vehicle in accordance with an embodiment of the present disclosure.

Referring to FIG.11, an embodiment of the present dis-closure also provides a self-moving vehicle 100, including a vehicle body 110 which is self-movable and a multi-beam laser radar 120 of any one of above-mentioned embodi-ments; the multi-beam laser radars 120 are positioned on both sides of a head and/or rear of the vehicle body 110. The self-moving vehicle 100 of the embodiment includes any one of the multi-beam laser radars 120 provided in the above embodiment, and has the same or corresponding technical effect of the multi-beam laser radar 120, which will not be described in detail herein.

In some embodiments, the laser radar 120 can be posi-tioned close to a lamp 130 of the vehicle body 110 or integrated into a module with the lamp 130. In this way, the multi-beam laser radar 120 is equivalent to being positioned at the intersection of two surfaces of the vehicle body 110. Thus, one transceiver module 20 of the multi-beam laser radar can detect the distance of obstacles in front area of the vehicle 100, and the other transceiver module 20 can detect obstacles in the side areas as a blinding detection, which reduces the installation quantity of the laser radar on the vehicle, greatly reduces the cost and improves the physical appearance of the vehicle.

Obviously, the above embodiments of the present disclo-sure are only exemplary embodiments, intending to clearly illustrate the present disclosure, rather than to limit the embodiments of the present disclosure. For ordinary person skilled in the art, other variations or changes may be made based on the above description. There is no need and cannot be an exhaustive list of all embodiments. Any modification, equivalent replacement and improvement made in the spirit and principles of the present disclosure shall be included in the protection scope of the claims of the present disclosure.

What is claimed is:

1. A multi-beam laser radar, comprising:
 a rotating prism, the rotating prism comprising at least three side surfaces positioned around a scanning rota-tion axis of the rotating prism; at least two of the at least three side surfaces being reflecting surfaces, an included angle between any specific one of the at least two reflecting surfaces and the scanning rotation axis being greater than an included angle between each of two neighboring reflecting surfaces of the specific reflecting surface and the scanning rotation axis, or less than an included angle between each of two neighbor-ing reflecting surfaces of the specific reflecting surface and the scanning rotation axis;
 a rotating mechanism, configured to drive the rotating prism to rotate around the scanning rotation axis; and
 two transceiver modules positioned at two sides of the rotating prism, respectively.

2. The multi-beam laser radar of claim 1, wherein an included angle formed by connecting lines between centers of the two transceiver modules and a center of the rotating prism is less than 180 degrees.

3. The multi-beam laser radar of claim 1, wherein the scanning fields of view of the two transceiver modules are not overlapped or partially overlapped in a horizontal direc-tion.

4. The multi-beam laser radar of claim 1, wherein the two transceiver modules comprise a first transceiver module and a second transceiver module; the first transceiver module forms a first scanning field of view when the rotating prism rotates, and the second transceiver module forms a second scanning field of view when the rotating prism rotates;
 a vertical scanning resolution of the first transceiver module in the first scanning field of view is greater than a vertical scanning resolution of the second transceiver module in the second scanning field of view; and
 a direction parallel to the scanning rotation axis of the rotating prism is defined as a vertical direction.

5. The multi-beam laser radar of claim 4, wherein a horizontal angle of the first scanning field of view is 0-180 degrees, and a horizontal angle of the second scanning field of view is 0-180 degrees.

6. The multi-beam laser radar of claim 1, wherein each transceiver module comprises at least one laser emitting unit and at least one laser receiving unit; each laser emitting unit comprises a plurality of lasers, and included angles of emergent beams of the plurality of lasers of one laser emitting unit are nonzero; and the plurality of lasers of one laser emitting unit are integrated on one circuit board; and
 each laser receiving unit comprises a plurality of photo-detectors, each photodetector configured to receive a light beam emitted by a corresponding one of the lasers and reflected by a to-be-measured target; and the plu-rality of photodetectors of one laser receiving unit are integrated on one circuit board.

7. The multi-beam laser radar of claim 6, wherein the emergent beams of the lasers of one laser emitting unit are arranged in a diverging form or in a converging form.

8. The multi-beam laser radar of claim 6, wherein the emergent beams of the lasers of each laser emitting unit are in one emergent plane; and emitting elevation angles of the emergent beams of the lasers of each laser emitting unit are different from each other.

9. The multi-beam laser radar of claim 6, wherein when the lasers in each laser emitting unit are arranged in a single group, the photodetectors in each laser receiving unit in the same group as the laser emitting unit are arranged in a single group; when the lasers in each laser emitting unit are arranged in a plurality of groups, the photodetectors in the laser receiving unit in the same group as the laser emitting unit are arranged in a plurality of groups; the laser emitting unit in each group comprises at least two lasers, and the laser receiving unit in each group comprises at least two photodetectors.

10. The multi-beam laser radar of claim 6, wherein each transceiver module further comprises a transmitting mirror group and a receiving mirror group; the transmitting mirror group is positioned between the at least one laser emitting unit and the rotating prism, for collimating laser beams emitted by the at least one laser emitting unit and projecting the collimated laser beams on the at least two reflecting surfaces of the rotating prism, and the receiving mirror group is positioned between the least one laser receiving unit and the rotating prism, for converging the laser beams reflected by the at least two reflecting surfaces of the rotating prism and projecting the converged laser beams on the at least one laser receiving unit.

11. The multi-beam laser radar of claim 6, further comprising:
   an encoder positioned on the rotating prism and configured to detect and output angle information of the rotating prism and/or speed information of the rotating mechanism; and/or
   a main control board, the rotating mechanism, the encoder, and the at least one laser emitting unit and the at least one laser receiving unit of each transceiver module being all connected to the main control board.

12. The multi-beam laser radar of claim 1, wherein included angles between all reflecting surfaces of the rotating prism and the scanning rotation axis are greater than or equal to 0 degrees, and less than or equal to 10 degrees.

13. The multi-beam laser radar of claim 1, wherein at least one reflecting surface of the rotating prism comprises at least two reflection areas successively distributed along the scanning rotation axis, and included angles between the at least two reflection areas and the scanning rotation axis are not exactly the same.

14. The multi-beam laser radar of claim 13, wherein a number of the at least two reflection areas are greater than or equal to 3, an included angle between a reflection area in a middle of the rotating prism and the scanning rotation axis is greater than the included angles between the reflection areas on both sides of the rotating prism and the scanning rotation axis.

15. The multi-beam laser radar of claim 1, wherein a plurality of sidewalls of the rotating prism form a hollow shaft; and
   the rotating mechanism is positioned in the hollow shaft of the rotating prism.

16. The multi-beam laser radar of claim 1, further comprising a housing and a filter cover, wherein the housing and the filter cover form a closed shell to protect the multi-beam laser radar, and the filter cover comprises two filtering areas facing emergent directions of the two transceiver modules, respectively.

17. The multi-beam laser radar of claim 16, wherein the two filtering areas are curved in shape.

18. A self-moving vehicle, comprising:
   a vehicle body, capable of being self-movable; and
   the multi-beam laser radar of claim 1, which is positioned at two sides of a head and/or rear of the vehicle body.

19. The self-moving vehicle of claim 18, wherein the multi-beam laser radar is positioned in a lamp of the vehicle body.

20. The multi-beam laser radar of claim 1, wherein the two transceiver modules are positioned asymmetrically with respect to the scanning rotation axis, and an included angle formed by laser emitting surfaces of the two transceiver modules is less than 180 degrees, such that scanning fields of view in at least two directions are formed when the rotating mechanism drives the rotating prism to rotate around the scanning rotation axis.

* * * * *